(12) United States Patent
Debban et al.

(10) Patent No.: US 9,841,573 B1
(45) Date of Patent: Dec. 12, 2017

(54) OPTICAL FIBER CABLE

(71) Applicant: OFS Fitel, LLC, Norcross, GA (US)

(72) Inventors: Harold P Debban, Snellville, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/216,807

(22) Filed: Jul. 22, 2016

(51) Int. Cl.
  *G02B 6/44* (2006.01)
(52) U.S. Cl.
  CPC ......... *G02B 6/4413* (2013.01); *G02B 6/4403* (2013.01); *G02B 6/4433* (2013.01); *G02B 6/4434* (2013.01)
(58) Field of Classification Search
  CPC .. G02B 6/4413; G02B 6/4403; G02B 6/4433; G02B 6/4434

USPC ......................................................... 385/103
See application file for complete search history.

(56) References Cited

U.S. PATENT DOCUMENTS

| | | | | |
|---|---|---|---|---|
| 5,561,729 A | * | 10/1996 | Parris | G02B 6/4432 385/100 |
| 2003/0059182 A1 | * | 3/2003 | Johnson | G02B 6/4403 385/112 |
| 2011/0206340 A1 | * | 8/2011 | Kobayashi | G02B 6/4471 385/137 |

* cited by examiner

*Primary Examiner* — Jerry Blevins
(74) *Attorney, Agent, or Firm* — Sam Han, Esq.

(57) ABSTRACT

A cable comprising a central member with a coating that is soft, and which deforms under compression. Ribbon stacks are then placed atop the soft material so that the bottoms of the ribbon stacks are in direct contact with the soft material, thereby causing the soft material to conform to the shape of the bottoms of the ribbon stacks.

20 Claims, 4 Drawing Sheets

OPTICAL FIBER CABLE

BACKGROUND

Field of the Disclosure

The present disclosure relates generally to fiber optics and, more particularly, to optical fiber cables.

Description of Related Art

Recent demands for increased data capacity have been met with installation of high-capacity optical fiber cables. Despite these ongoing efforts to meet the increasing demands, there still exists an unaddressed need in the industry for higher density optical fiber cables.

SUMMARY

The present disclosure provides for compact optical fiber cable structures.

Briefly described, in architecture, one embodiment is a cable comprising a central member with a coating that has a low Shore hardness (also designated herein as a soft material or soft compound) that deforms under compression. Ribbon stacks are then placed atop the soft material so that the bottoms of the ribbon stacks are in direct contact with the soft material. This causes the soft material to conform to the shape of the bottoms of the ribbon stacks.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
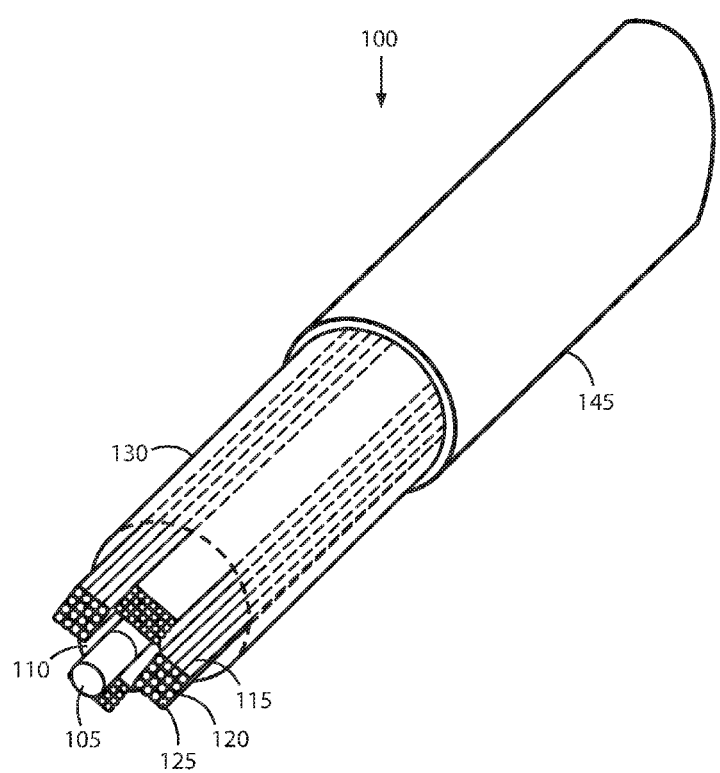
FIG. 1A is a diagram showing one embodiment of an optical fiber cable.

Currently, high density optical fiber cables are manufactured using slotted core ribbons, rollable ribbons, partially-bonded ribbons, or micro modules, all of which are known in the art. However, each of these manufacturing methods have their drawbacks. For example, micro module cables use loose 250 micrometer (μm) fibers and cannot be mass fusion spliced without a time-consuming field ribbonization step, thereby limiting the desirability of such cables. Slotted core ribbon cables using flat ribbons are difficult to manufacture, while rollable ribbons for use in high density cables are difficult to procure and manufacture. In view of the drawbacks associated with each of these technologies, it is difficult to achieve a cable structure that both incorporates low-cost, readily available flat optical ribbons that permit direct mass fusion splicing and has a higher fiber density (more fibers per cross-sectional area) than currently-existing cables.

The disclosed embodiments comprise a central member of a cable with a coating that has a low Shore hardness (a soft material or soft compound) that deforms under compression. Ribbon stacks are then placed atop the soft material so that the bottoms of the ribbon stacks are in direct contact with the soft material. This causes the soft material to conform to the shape of the bottoms of the ribbon stacks. Because the soft material acts as a deformable substrate for the ribbons stacks, the cable diameter is reduced and the fiber density is increased as compared to conventional cable designs.

Having provided a general description of the inventive solution for a high-density optical fiber cable, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1B:
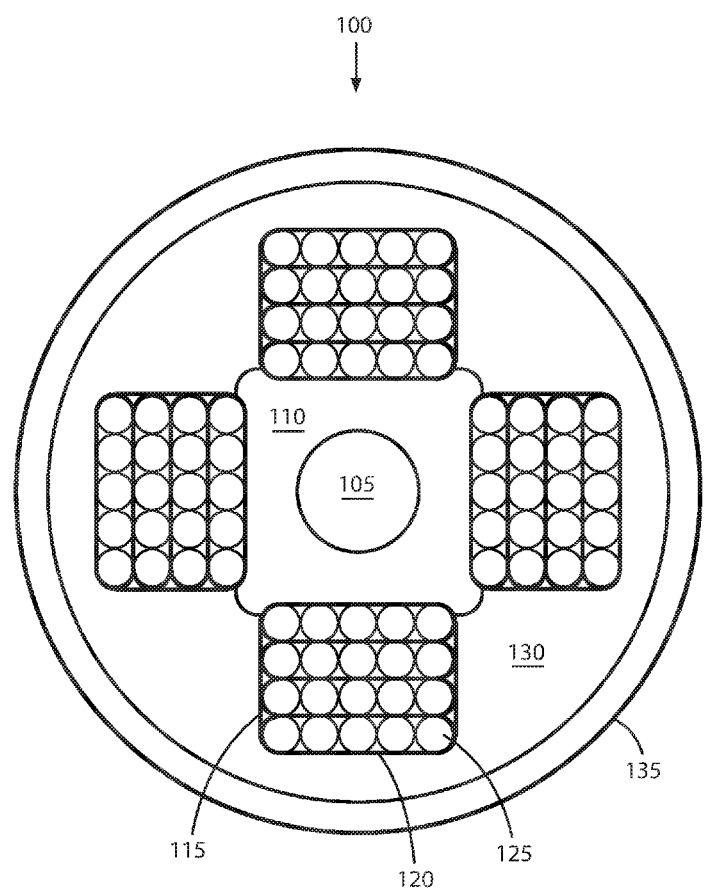
FIG. 1B is a diagram showing a cross-section of the cable of FIG. 1A.

FIGS. 1A and 1B (collectively, "FIG. 1") are diagrams showing one embodiment of an optical fiber cable 100. Specifically, FIG. 1A shows a perspective view of the cable 100, while FIG. 1B shows a cross-section of the cable 100. As shown in FIG. 1, one embodiment of the inventive cable 100 comprises a central member 105, which is coated with a soft material 110, and ribbon stacks 115 disposed atop the soft material 110. Because the soft material 110 is compressible, the disposition of the ribbon stacks 115 results in a compression and deformation of the soft material to conform to the shape of the bottom of each of the ribbon stacks 115.

For the specific embodiment of FIG. 1, four (4) ribbon stacks 115 are disposed radially equidistant about the central member 105 (e.g., at 12 o'clock, 3 o'clock, 6 o'clock, and 9 o'clock positions), thereby compressing the soft material 110 at four (4) locations (12 o'clock, 3 o'clock, 6 o'clock, and 9 o'clock). Preferably, the ribbon stacks 115 are disposed helically about the soft material 110, thereby causing the pressure to be applied radially inward toward the radial center of the central member 105.

An encapsulate 130 (also called a buffer or a filler) is formed over the ribbon stacks 115 using a pressure die so that the spaces or gaps between the ribbon stacks are filled with the encapsulate 130. In other words, the interstitial spaces between the ribbon stacks 115 are filled with the encapsulate 130. The ribbon stacks 115 and the encapsulate 130 are surrounded by a jacket 145. As is known, the ribbon stacks 115 comprise multiple ribbons 120 that are stacked to form each of the ribbon stacks 115, with each ribbon 120 comprising multiple optical fibers 125. The use of ribbon stacks 115 permits mass fusion splicing, which facilitates installation of the cable 100.

A compressible soft material 110, such as that shown in FIG. 1, provides several advantages over conventional cable designs. For example, disposing ribbon stacks 115 on a compressible soft material 110 reduces the diameter of the cable as compared to conventional slotted-core designs. This is because slotted-core designs require sufficient clearance within the slot to allow for ribbon stacks to be freely inserted into the slots, thereby increasing the cross-sectional areas that are needed for conventional slotted-core cable designs. Also, the compressible soft material 110 increases fiber densities as compared to conventional ribbons-in-loose-tube ("RILT") designs. This is because RILT designs also require buffer tubes that house each of the ribbon stacks, thereby increasing the cross-sectional areas of RILT cables.

It should be noted that the soft material 110 must be sufficiently compressible to allow strain relief for the optical fibers, but must also retain its shape over operating temperature ranges of the cable. Furthermore, the soft material 110 cannot melt at higher temperatures or become too soft or too hard at extremes of operating temperatures. Also, elongation before the breaking point of the encapsulate 130 should be limited so that the encapsulate 130 can be peeled away from the ribbon stacks 115 during cable installation.

Preferably, both the soft material 110 and the encapsulate 130 comprise absorbent powder or other water-absorbing material to keep the optical fibers 125 dry. Also, for embodiments that have multiple ribbon stacks 115, each ribbon stack preferably includes a color marking to distinguish one ribbon stack from another ribbon stack.

The embodiment of FIG. 1 can be specifically configured as a 96-fiber micro cable with 250 micrometer (μm) optical fibers (which have a coating diameter of 250 μm). Using 250 μm optical fibers allows for an outer diameter of six (6) millimeters (mm), which is suitable for air-blown units. The micro cable fits within an 8 mm inner-diameter cable duct with a 0.75 inner-diameter-to-outer-diameter (d/D) ratio for installation. For the 96-fiber micro cable configuration, the cable 100 comprises four (4) ribbon stacks 115, with each ribbon stack 115 comprising four (4) ribbons 120, and each ribbon comprising six (6) optical fibers 125, thereby resulting in a total fiber count of 96 optical fibers (i.e., 4×4×6=96). It should be appreciated that the total ribbon count, fiber count, fiber dimensions, etc., can be changed to accommodate different cable configurations, such as the one shown in FIGS. 2A and 2B (collectively, "FIG. 2").

Figure 2A:
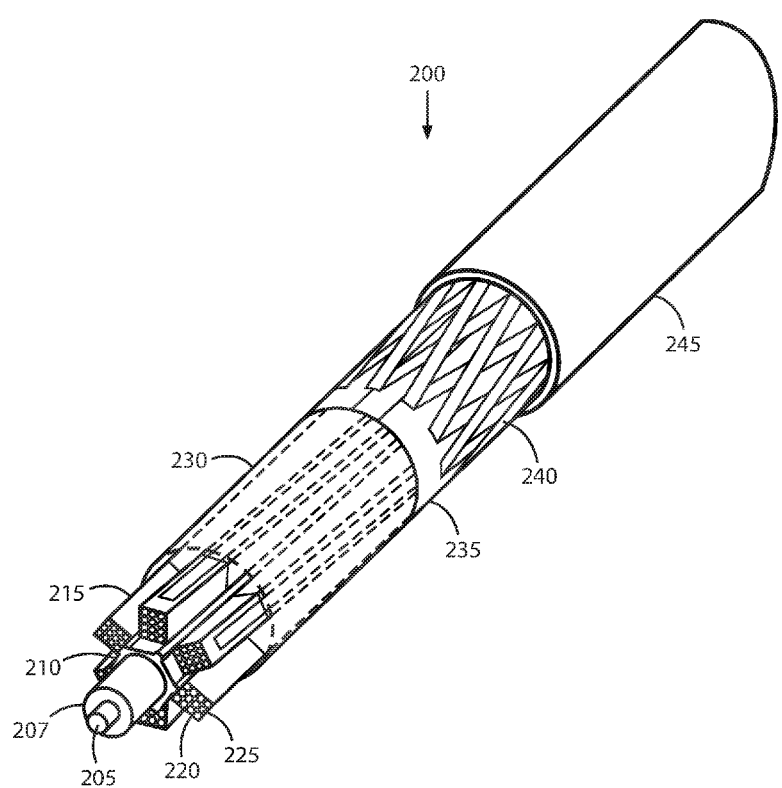
FIG. 2A is a diagram showing another embodiment of an optical fiber cable.
Figure 2B:
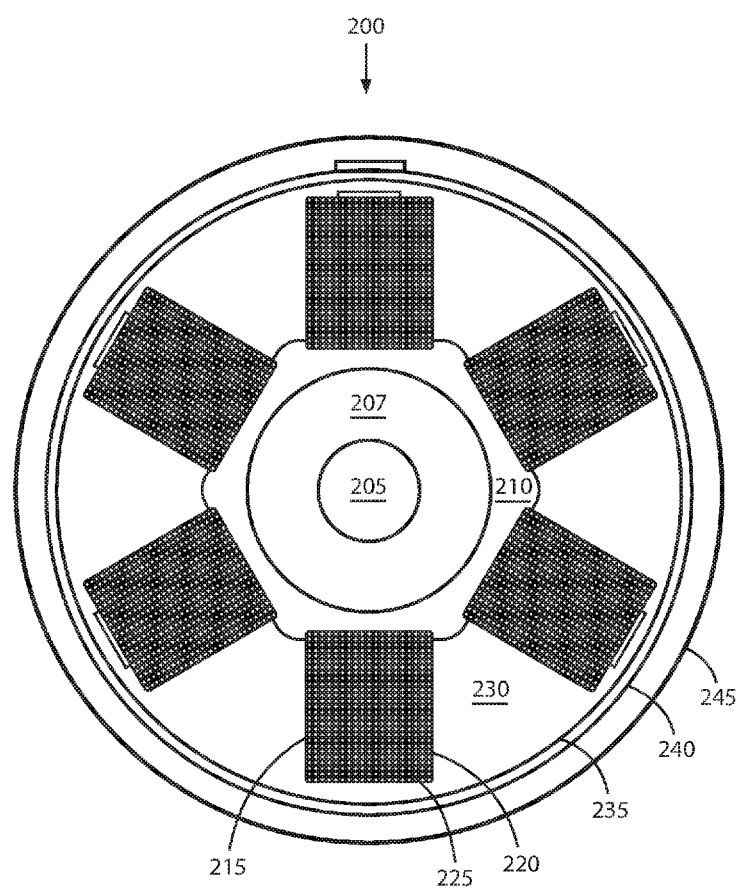
FIG. 2B is a diagram showing a cross-section of the cable of FIG. 2A.

FIG. 2 shows another embodiment of an optical fiber cable 200. Specifically, FIG. 2A shows a perspective view of the cable 200, while FIG. 2B shows a cross-section of the cable 200. As shown in FIG. 2, another embodiment of the inventive cable 200 comprises a central member, which comprises a central strength member 205 that is jacketed with a central member jacket 207. The central member jacket 207 is coated with a soft material 210, and ribbon stacks 215 disposed atop the soft material 210. Similar to FIG. 1, the soft material 210 of FIG. 2 is compressible. Thus, the disposition of the ribbon stacks 215 results in a compression and deformation of the soft material 210 to conform to the shape of the bottom of each of the ribbon stacks 215.

For the specific embodiment of FIG. 2, six (6) ribbon stacks 215 are disposed radially equidistant about the central member jacket 207 (e.g., at 12 o'clock, 2 o'clock, 4 o'clock, 6 o'clock, 8 o'clock, and 10 o'clock positions), thereby compressing the soft material 210 at six (6) locations (12 o'clock, 2 o'clock, 4 o'clock, 6 o'clock, 8 o'clock, and 10 o'clock). Preferably, the ribbon stacks 215 are disposed helically about the soft material 210, thereby causing the pressure to be applied radially inward toward the radial center of the central strength member 205.

An encapsulate 230 is formed over the ribbon stacks 215 using a pressure die so that the interstitial spaces between the ribbon stacks 215 are filled with the encapsulate 230. The ribbon stacks 215 and the encapsulate 230 are surrounded by an inner jacket 235, which is in turn surrounded by a dielectric strength member 240 (e.g., woven aramid yarn, fiberglass yarn, para-aramid strength yarn, or armor). An outer jacket 245 surrounds and protects the cable 200. Similar to FIG. 1, both the soft material 210 of FIG. 2 and the encapsulate 230 of FIG. 2 comprise absorbent powder or other water-absorbing material to keep the optical fibers 225 dry. Also, for embodiments that have multiple ribbon stacks 215, each ribbon stack preferably includes a color marking to distinguish one ribbon stack from another ribbon stack.

The ribbon stacks 215 comprise multiple ribbons 220 that are stacked to form each of the ribbon stacks 215, with each ribbon 220 comprising multiple optical fibers 225. Thus, the embodiment of FIG. 2 can also be specifically configured for higher fiber densities while permitting mass fusion splicing. It should be appreciated that either 250 μm optical fibers (which have a coating diameter of approximately 250 μm) or 200 μm fibers (having a coating diameter of approximately 200 μm) can be used in the cables 100, 200.

For purposes of illustration, two (2) specific configurations of FIG. 2 are described, namely: (a) a 3,456-fiber cable (which has 3,456 optical fibers); and (b) a 432-fiber armored cable (which has 432 optical fibers).

Preferably, one embodiment of a 3,456-fiber cable 200 comprises six (6) ribbon stacks 215, with each ribbon stack 215 comprising twenty-four (24) ribbons 220, and each ribbon 220 comprising twenty-four (24) optical fibers 225 (i.e., 24×24×6=3,456). Using 250 μm optical fibers 225, the 3,456-fiber cable 200 has an outer diameter of 1.4 inches (or 35.5 mm). The 1.4-inch dimension allows it to fit into a 2-inch (or 5.1 mm) inner-diameter duct with a 0.7 d/D ratio for installation.

One embodiment of a 432-fiber armored cable preferably comprises six (6) ribbon stacks 215, with each ribbon stack 215 comprising six (6) ribbons 220, and each ribbon 220 comprising twelve (12) optical fibers 225 (i.e., 6×6×12=432). Such a configuration permits mass fusion splicing. Also, the 432-fiber armored cable preferably comprises conventional armoring (for strength) and 200 μm fibers (rather than 250 μm fibers), which increases fiber density. This type of 432-fiber configuration permits an outer diameter of 17 mm. Thus, the 432-fiber configuration fits a 2-inch inner-diameter duct with a 0.7 d/D ratio for installation. Those having skill in the art will appreciate that 200 μm fibers have greater sensitivity to breakage and will also require different splicing techniques as compared to 250 μm fibers.

As shown from the various embodiments illustrated with reference to FIGS. 1A, 1B, 2A, and 2B, the implementation of a compressible soft material 110, 210 provides several advantages over conventional cable designs. For example, disposing ribbon stacks 115, 215 on compressible soft material 110, 210 reduces the diameter of the cable 100, 200, thereby increasing the density (fibers per square millimeter) of the optical fibers 125, 225 as compared to conventional designs while concurrently permitting mass fusion splicing.

Although exemplary embodiments have been shown and described, it will be clear to those of ordinary skill in the art that a number of changes, modifications, or alterations to the disclosure as described may be made. For example, it should be appreciated that soft materials 110, 210 have a Shore A (10 second) hardness (10 second) that is preferably between approximately 30 and approximately 90. For more-preferable embodiments, the Shore A hardness for soft materials 110, 210 is between approximately 30 and approximately 60. Some examples of soft materials 110, 210 include, but are not limited to, triblock copolymers of styrene-ethylene/butylene-styrene (SEBS) or styrene-ethylene/propylene-styrene (SEPS), thermoplastic polyurethane (TPU), KRATON® styrenic thermoplastic elastomers, polyether thermoplastic elastomers, polyester thermoplastic elastomers, and extrudable rubbers.

All of these materials may be optionally extended through the addition of mineral oil or other liquid extenders, or alternately by being foamed. The incorporation of oil through blending or air through foaming may have the desirable effect of reducing the hardness of the soft material further, thus providing improved cushioning for the fibers.

Moreover, although a four-ribbon-stack embodiment (FIG. 1) and a six-ribbon-stack embodiment (FIG. 2) are shown, it should be appreciated that the cable 100, 200 can be configured with any integer number (n) of stacks, with n being greater than or equal to 2 (n≥2), preferably in even increments (e.g., 2 stacks, 4 stacks, 6 stacks, 8 stacks, etc.). Furthermore, it should be appreciated that the ribbons 120, 220 that form the ribbon stacks 115, 215 can be 6-fiber ribbons, 6-fiber ribbons, 8-fiber ribbons, 12-fiber ribbons, 18-fiber ribbons, 24-fiber ribbons, etc., and that the optical fibers within the ribbons can be either 200 µm optical fibers or 250 µm optical fibers. It should be appreciated that, with proper assembly equipment and monitoring, any combination or permutations of these values can be used to manufacture the cable 100, 200 without adversely affecting the performance characteristics of the cable. All such changes, modifications, and alterations should therefore be seen as within the scope of the disclosure.

What is claimed is:
1. An optical fiber cable, comprising:
a central member, comprising:
a central strength member; and
a central member jacket surrounding the central strength member;
a soft material coating the central member;
ribbon stacks helically disposed around the soft material, the ribbon stacks compressing and deforming the soft material;
an encapsulate disposed between the ribbon stacks; and
a jacket surrounding the ribbon stacks, the jacket further surrounding the encapsulate.
2. The cable of claim 1, the jacket comprising:
an inner jacket surrounding the ribbon stacks, the inner jacket further surrounding the encapsulate;
a strength member surrounding the inner jacket; and
an outer jacket surrounding the strength member.
3. The cable of claim 2, the strength member comprising a layer of armor.
4. The cable of claim 2, the strength member comprising a layer of para-aramid strength yarn.
5. The cable of claim 2, the strength member comprising a layer of fiberglass yarn.
6. The cable of claim 1, the soft material having a shore a (10 second) hardness between approximately 30 and approximately 90.
7. The cable of claim 1, the soft material being one selected from the group consisting of:
KRATON® styrenic thermoplastic elastomers;
polyether thermoplastic elastomers;
polyester thermoplastic elastomers;
thermoplastic polyurethanes; and
extrudable rubbers.
8. An optical fiber cable, comprising:
a central member;
a ribbon stack having a bottom;
a soft material disposed between the central member and the bottom of the ribbon stack, the soft material being compressed by the ribbon stack; and
a deformation in the soft material, the deformation having a shape that corresponds to the bottom of the ribbon stack.
9. The cable of claim 8, the soft material having a shore a (10 second) hardness between approximately 30 and approximately 90.
10. The cable of claim 9, the soft material further having a shore a (10 second) hardness between approximately 30 and approximately 60.
11. The cable of claim 8, the soft material being one selected from the group consisting of:
KRATON® styrenic thermoplastic elastomers;
polyether thermoplastic elastomers;
polyester thermoplastic elastomers;
thermoplastic polyurethanes; and
extrudable rubbers.
12. The cable of claim 8, further comprising:
an inner jacket surrounding the ribbon stack, the inner jacket further surrounding the soft material.
13. The cable of claim 12, further comprising an encapsulate located between the inner jacket and the soft material.
14. The cable of claim 12, further comprising:
a strength member surrounding the inner jacket.
15. The cable of claim 14, further comprising:
an outer jacket surrounding the strength member.
16. The cable of claim 14, the strength member comprising woven aramid yarn surrounding the inner jacket.
17. The cable of claim 14, the strength member comprising a layer of armor surrounding the inner jacket.
18. An optical fiber cable, comprising:
a central member, comprising:
a central strength member; and
a central member jacket surrounding the central strength member;
a soft material coating the central member, the soft material having a shore a (10 second) hardness between approximately 30 and approximately 90;
n ribbon stacks helically disposed around the soft material, n≥2, the ribbon stacks compressing and deforming the soft material, the ribbon stacks comprising ribbons, the ribbons comprising optical fibers;
an encapsulate disposed between the ribbon stacks; and
a jacket surrounding the ribbon stacks, the jacket further surrounding the encapsulate, the jacket comprising:
an inner jacket surrounding the ribbon stack, the inner jacket further surrounding the encapsulate;
a strength member being selected from the group consisting of:
a layer of armor surrounding the inner jacket; and
a woven aramid yarn surrounding the inner jacket; and
an outer jacket surrounding the strength member.
19. The cable of claim 18, the ribbon stacks having a total optical fiber count selected from the group consisting of:
3,456 optical fibers;
432 optical fibers; and
96 optical fibers.
20. The cable of claim 18, each of the ribbon stacks comprising a ribbon selected from the group consisting of:
a 24-fiber ribbon comprising 250 µm optical fibers;
an 18-fiber ribbon comprising 250 µm optical fibers;
a 12-fiber ribbon comprising 250 µm optical fibers;
a 9-fiber ribbon comprising 250 µm optical fibers;
a 6-fiber ribbon comprising 250 µm optical fibers;
a 24-fiber ribbon comprising 200 µm optical fibers;
an 18-fiber ribbon comprising 200 µm optical fibers;
a 12-fiber ribbon comprising 200 µm optical fibers;

a 9-fiber ribbon comprising 200 μm optical fibers; and
a 6-fiber ribbon comprising 200 μm optical fibers.

\* \* \* \* \*